United States Patent
Rijskamp et al.

(10) Patent No.: US 12,016,485 B2
(45) Date of Patent: Jun. 25, 2024

(54) DRIP TRAY COVER AND A DRIP TRAY FOR USE IN A DRINKS MACHINE

(71) Applicant: KONINKLIJKE PHILIPS N.V., Eindhoven (NL)

(72) Inventors: Peter Rijskamp, Eindhoven (NL); Bhagyaraj Raman Nair, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 696 days.

(21) Appl. No.: 17/262,737

(22) PCT Filed: Jun. 24, 2019

(86) PCT No.: PCT/EP2019/066568
§ 371 (c)(1),
(2) Date: Jan. 24, 2021

(87) PCT Pub. No.: WO2020/002172
PCT Pub. Date: Jan. 2, 2020

(65) Prior Publication Data
US 2021/0186255 A1    Jun. 24, 2021

(30) Foreign Application Priority Data
Jun. 28, 2018 (EP) .................... 18180391

(51) Int. Cl.
*A47J 31/44* (2006.01)
(52) U.S. Cl.
CPC ........ *A47J 31/4428* (2013.01); *A47J 31/4425* (2013.01)

(58) Field of Classification Search
CPC .......................... A47J 31/4428; A47J 31/4425
USPC .................................. 99/285; 73/290 R, 323
See application file for complete search history.

(56) References Cited

U.S. PATENT DOCUMENTS

| 5,505,845 | A | 4/1996 | Ford |
| 8,528,466 | B2 | 9/2013 | Sweet et al. |
| 10,004,871 | B2 * | 6/2018 | Kat .................. A61M 16/0066 |
| 2007/0266861 | A1 | 11/2007 | Hart |
| 2009/0242585 | A1 | 10/2009 | Wang et al. |
| 2012/0031278 | A1 | 2/2012 | Sweet et al. |
| 2013/0008440 | A1 | 1/2013 | Maurer et al. |

(Continued)

FOREIGN PATENT DOCUMENTS

| DE | 2009027499 A1 * | 7/2009 | .......... A47J 31/4428 |
| DE | 102014216486 B3 | 2/2016 | |
| DE | 102015205123 A1 | 9/2016 | |

(Continued)

OTHER PUBLICATIONS

Extended European Search Report issued in connection with corresponding EP Application No. 18180391.7 dated Dec. 21, 2018.

(Continued)

*Primary Examiner* — Reginald Alexander
(74) *Attorney, Agent, or Firm* — Maschoff Brennan

(57) ABSTRACT

A drip tray cover for a beverage machine has a projection for facing a downward direction in use having a tip which is adapted to reach below a maximum liquid level of a drip tray base beneath. At least one opening makes the projection visible to a user and it functions as dipstick for inspecting the liquid level in the drip tray.

11 Claims, 2 Drawing Sheets

(56) References Cited

U.S. PATENT DOCUMENTS

2014/0007777 A1    1/2014    Sweet et al.
2014/0352802 A1    12/2014    Lardelli et al.

FOREIGN PATENT DOCUMENTS

| FR | 2648695 A1 * | 6/1989 | .......... A47J 31/4428 |
|----|---|---|---|
| JP | H06-113955 A | 4/1994 | |
| JP | H08-29596 A | 2/1996 | |
| JP | 2002-284296 A | 10/2002 | |
| JP | 2009154919 A | 7/2009 | |
| RU | 2526677 C2 | 8/2014 | |
| RU | 2608714 C2 | 1/2017 | |
| WO | 9724052 A1 | 7/1997 | |
| WO | 2008072295 A1 | 6/2008 | |

OTHER PUBLICATIONS

International Search Report and Written Opinion issued in connection with corresponding PCT Application No. PCT/EP2019/066568 dated Sep. 26, 2019.

* cited by examiner

DRIP TRAY COVER AND A DRIP TRAY FOR USE IN A DRINKS MACHINE

CROSS-REFERENCE TO RELATED APPLICATIONS

The present application is a U.S. National Phase application under 35 U.S.C. § 371 of International Application No. PCT/EP2019/066568, filed on Jun. 24, 2019, which claims the benefit of European Patent Application No. 18180391.7, filed on Jun. 28, 2018. These applications are hereby incorporated by reference herein.

FIELD OF THE INVENTION

This invention relates to drip trays for drinks machines.

BACKGROUND OF THE INVENTION

Drinks machines generally have a drinks dispensing outlet beneath which a cup or mug is placed to collect the dispensed drink.

The cup or mug is typically positioned on a support, beneath which a drip tray is mounted to collect spillage. The drip tray has a cover on which the cup or mug is placed, which functions as the support.

The trip tray and its cover are typically removable from the machine for emptying and cleaning. Alternatively, only the cover may be removable and the drip tray may then be cleaned without removal.

The drip tray needs to be emptied and cleaned before it is full. Thus, there is a need to be able to check the amount of spillage collected in the drip tray. In a most basic drinks machine, this may simply involve periodically removing the drip tray cover to check. This has the risk that the user does not check sufficiently frequently, so that the overfilling occurs or else the drip tray is so full that handling for cleaning becomes difficult.

Other drinks machines incorporate a floater within the drip tray, which visibly shows when the liquid reaches a set level. This requires an extra part placed in the (dirty) drip tray which makes it difficult to clean and fragile, and the user can misplace the floater during cleaning.

The floater does not allow the user to see the actual liquid level and it may not be simple to ascertain the liquid level because the user may have to judge the float height.

It has been proposed to provide a larger area of the drip tray cover though which the liquid can be seen so that a better visual inspection of the liquid level is possible. This is for example disclosed in JPH06-113955 in which a tube extends down to the drip tray base, and the liquid level up the tube can be inspected. However, a large tube is required so that capillary effects do not come into play, and this detracts from aesthetic appearance of the drip tray.

SUMMARY OF THE INVENTION

The invention is defined by the claims.

According to examples in accordance with an aspect of the invention, there is provided a drip tray cover for a beverage machine, comprising:
a set of openings for allowing liquid to pass to a drip tray base beneath the drip tray cover; and
a projection having an open shape for facing a downward direction in use having a tip which is adapted to reach below a maximum liquid level of the drip tray base beneath and thereby function as a dipstick,
wherein at least one opening is positioned to enable a line of sight to the projection from a user location of the beverage machine.

This cover has an integrated projection that functions as a dipstick, which is visible through one of the openings in the cover. In this way, a user can easily see when the liquid level reaches a maximum, by seeing the actual liquid against the projection. This design directly shows the waste water level without the need for additional parts, and is thus easy to clean and maintain.

The projection has an open shape which means it is not intended to surround a liquid portion but instead forms a tab which projects into the liquid. The projection may be a generally flat tab or a curved but open wall.

The projection is preferably an integral part of the drip tray cover. Thus, the projection may be formed as part of a stamping process for a metal drip tray cover or a molding process for a plastics drip tray cover.

The projection for example extends downwardly from a location at a rear side of the at least one opening. In this way, the projection is visible through the opening when viewed from in front. Thus, the user is able to see the projection and read off the liquid level.

The projection for example comprises a marking which indicates the maximum liquid level. This maximum liquid level is below a top of the drip tray base, so that cleaning can be carried out without risk of spillage.

The marking may comprise an orifice or projection. This may provide an easy to see marker, which changes visibly in appearance when empty compared to when full of liquid.

The projection may have a surface area and shape corresponding to the at least one opening. This means the projection may be pressed out from the opening during a pressing stage. This is particularly suitable for a metal drip tray cover.

The drip tray cover may comprise a set of projections, each projection associated with a respective opening, wherein at least two of the projections and associated openings provide lines of sight from different user locations.

In this way, multiple dipsticks are provided, and they are designed to be visible from different viewing directions, so that for a range of possible user positions, at least one dipstick is clearly visible.

The invention also provides a drip tray comprising a drip tray base for collecting liquid and a drip tray cover as defined above.

The invention also provides a drinks machine comprising:
a drink dispenser having a dispensing outlet; and
a drip tray as defined above positioned below the dispensing outlet.

The drinks machine is for example a domestic drinks machine, which is thus typically not plumbed in either to a water supply or to a waste water outlet, and hence requires manual inspection and emptying of the drip tray. The drinks machine is for example a coffee machine.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
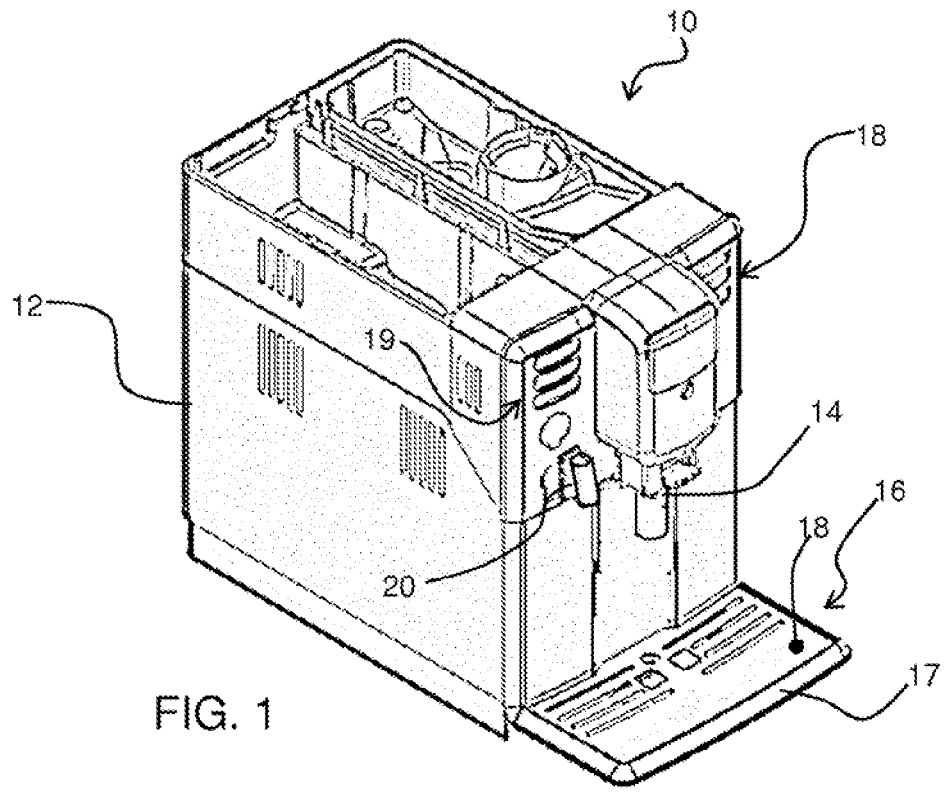
FIG. 1 shows an example of a drinks machine.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a drip tray cover for a beverage machine having a projection for facing a downward direction in use having a tip which is adapted to reach below a maximum liquid level of a drip tray base beneath. At least one opening makes the projection visible to a user and it functions as dipstick for inspecting the liquid level in the drip tray.

The invention may be applied to any drinks machine which has a drink dispensing nozzle provided over a drip tray. The drip tray serves to collect spillage from the nozzle, but in many machines it also serves to collect water that is discharged from the internal hydraulics of the machine, e.g. water that is too hot (after steam generation for frothing milk the heater needs some time to cool down), or too cold, or rest water from the brew chamber.

By way of example only, FIG. 1 shows a drinks machine 10 in the form of a full function espresso coffee machine, in perspective view. This example is a bean-to-cup machine, although other options are possible as mentioned further below.

It comprises a main body 12 which houses a water reservoir, a water heater and a reservoir for receiving coffee beans. There is an internal grinding mechanism for creating coffee grind, a brewing chamber or brew group for receiving the coffee grind, and a pumping system for pumping heated water through the coffee grind.

An espresso coffee is typically made by forcing pressurized water to flow through a quantity of coffee grind. The brewing chamber is for example removably arranged in order to facilitate emptying and cleaning of the brewing chamber.

During an espresso making process, the coffee grind is compressed to a certain extent. To this end, the machine for example comprises a piston, which is movably arranged in a cylindrical brewing chamber, and which is capable of sealing an open top side of the brewing chamber.

Movement of the piston controls the extent of compression of the coffee grind. When the coffee grind is compressed more and more, a flow through resistance of the coffee grind increases. During an espresso making process, a brewing pressure at which the process is performed, i.e. a pressure at which the water is conducted through the coffee grind, is determined by the flow through resistance of the coffee grind.

The machine comprises a coffee output tube 14, which is the main dispensing outlet, from which the espresso drink (without milk) is output. The coffee output tube 14 faces downwardly and is located over a drip tray 16. The drip tray 16 is removable from the main body for emptying and cleaning. It comprises a base part 17 for collecting liquid and a drip tray cover 18. The drip tray cover functions as a support plate for receiving a cup into which the coffee is dispensed. It comprises a set of openings to allow spilled liquid to pass to the base part 17 where it is collected.

FIG. 1 also shows a user interface 19 for receiving user selections, such as for water selection and for other drinks selections. Some of the drinks selections may relate to drinks recipes which include frothed milk and therefore require the generation of steam. An output nozzle 20 is provided for delivering steam or hot water. This is an additional dispensing outlet. This depends on user selection at the user interface 19. The steam output is used for generating frothed milk, and the option of a hot water only output gives additional options to the user, for example for making soup, tea, hot chocolate etc.

This full function espresso machine is only one example of the type of drinks machine to which the invention may be applied. Drip trays 16 are used in all manner of drinks machines, for example other coffee machines which receive already-ground coffee or coffee pods, capsules, cartridges or the like consumables, as well tea making machines and other drinks machines.

Figure 2:
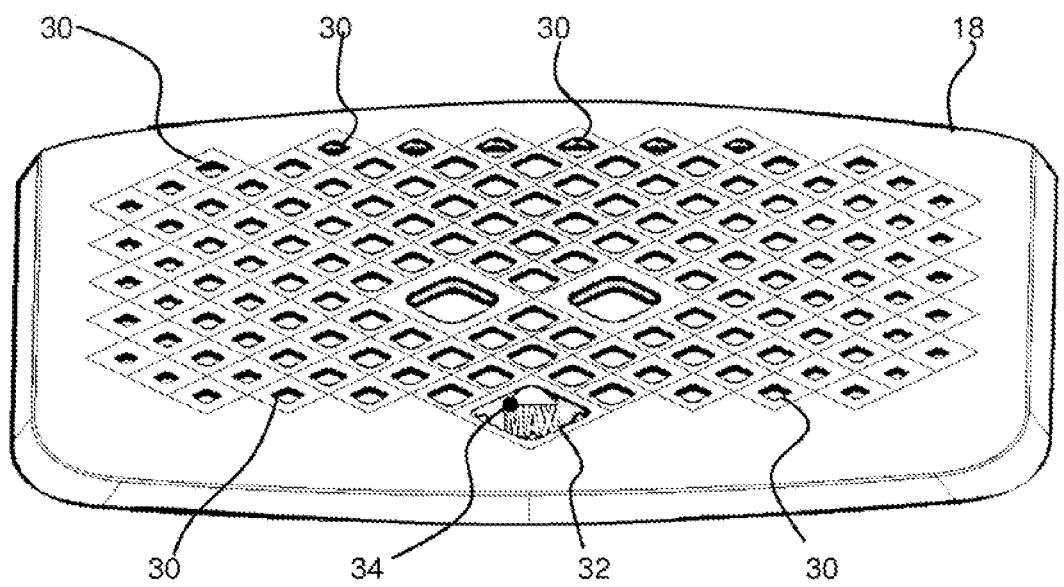
FIG. 2 shows a drip tray cover.

FIG. 2 shows an example of a drip tray cover 18 in accordance with the invention.

The cover is in the form of a plate which acts as a support for a cup or mug, having a set of openings 30, 32 for allowing liquid to pass to a drip tray base 17 (FIG. 1) beneath the drip tray cover.

The openings may for example be larger where the spillage is likely to be greatest i.e. beneath the coffee output tube 14. The openings are designed both for their function and to give a desired aesthetic appearance.

At least one opening 32 is provided with a projection 34 for facing a downward direction in use, to function as a dipstick to enable visual inspection of a liquid level in the drip tray base.

The opening 32 is positioned relative to the projection 34 to enable a line of sight to the projection from a typical user location, i.e. in front of the beverage machine and at a higher position than the drip tray.

The projection is thus visible through the opening 32 so that the user can easily see when the liquid level reaches a maximum, by seeing the actual liquid against the projection.

The drip tray cover may be a single component, for example of molded plastic or pressed metal. The projection is thus an integral part of the drip tray cover. The projection may comprise a folded down cut-out portion of the drip tray cover which then forms the opening 32. In this way, the drip tray cover may be formed from a sheet, giving a low cost and simple manufacturing process.

For example, the opening 32 may comprise a square, rectangle or parallelogram shape, and the projection 34 is then a planar tab which comprises a folded down region corresponding in size and shape to the opening, folded down from a corner or an edge.

The projection may be curved instead of planar. However it is an open shape which means the line of contact between the projection and the liquid is an open line (straight or curved). Thus no capillary tube effects are generated, and an accurate liquid level reading may be taken, in a similar manner to a planar dipstick.

As shown in FIG. 2, the projection extends downwardly from a location at a rear side of the opening 32. In this way, the projection is visible through the opening when viewed from in front. Thus, the user is able to see the projection and read off the liquid level.

Figure 3:
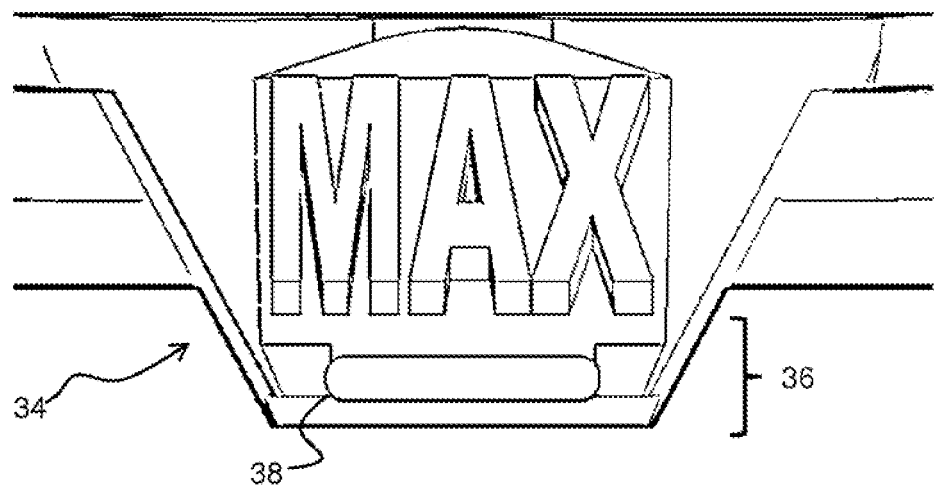
FIG. 3 shows an example of one projection in more detail.

FIG. 3 shows one example of the projection 34 in more detail. It comprises a tip 36 which is adapted to reach below a maximum liquid level of the drip tray base beneath.

The tip for example has a level marker 38 which represents the maximum liquid level. This level marker may be a line, a projection or an orifice. The aim is to provide a visual reference, such that the presence or absence of liquid at that level can be easily identified.

The projection also includes a written indicator "MAX" which makes clear that the marker 38 corresponds to the maximum liquid level.

Figure 4:
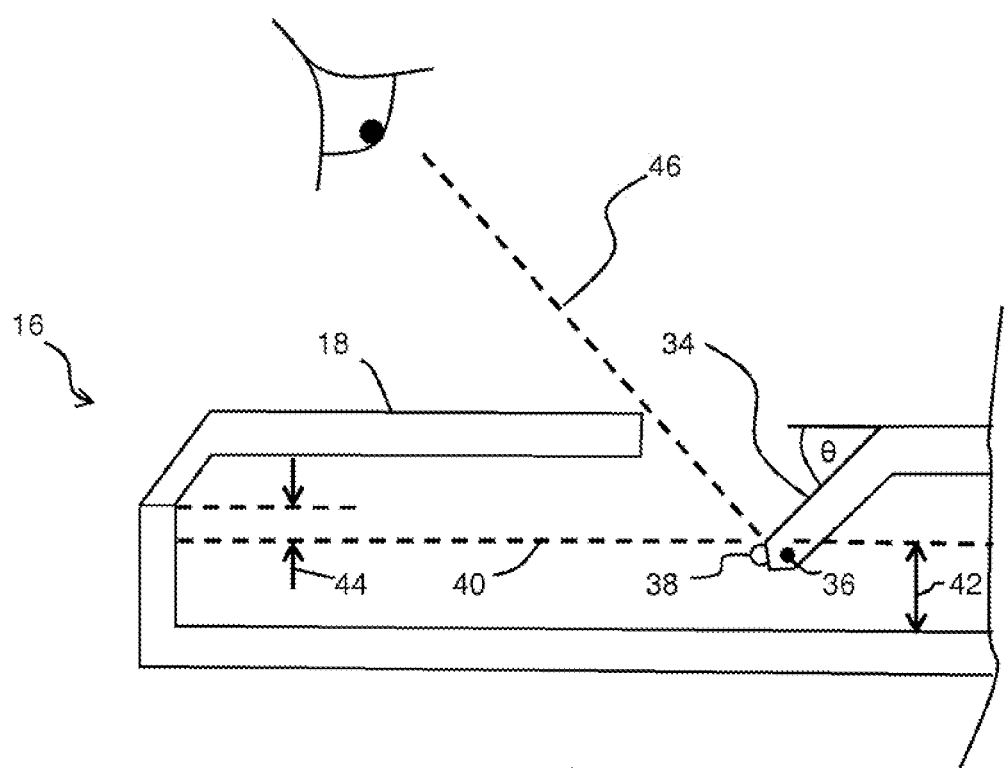
FIG. 4 shows a drip tray.

FIG. 4 shows a portion of the overall drip tray 16, comprising the base 17, drip tray cover 18 and the projection 34 which extends below the maximum recommended liquid level 40. This corresponds to a liquid depth 42, but there is a safety margin 44 by which the maximum recommended liquid level is below the top of the drip tray base 17.

The drip tray cover 18 is generally flat (apart from the projections and an outer rim), with a top side and an underside. The projection 34 for example projects a distance below the underside in a range 5 mm to 40 mm, for example 5 mm to 25 mm.

FIG. 4 shows the line of sight 46 to the projection, and in particular the tip 36, from a location corresponding to the typical position of a user's eyes when operating the drinks machine.

The projection is shown to extend downwardly, but not vertically (i.e. not perpendicular to the general plane of the cover). Instead, there is an angle θ to the general plane of the cover. The angle may be between 45 degrees and 90 degrees (inclusive), so the projection may extend fully downwardly. A shallower angle may improve readability but may also require a larger opening for the tip to be visible. The angle may be between 50 and 85 degrees, for example between 60 and 80 degrees.

In the example above, only one projection is shown. However, there may be a set of projections, each projection associated with a respective opening. One projection may be more easily visible to the user than the other or others. Indeed, this may be a deliberate part of the design, by arranging that two or more different projections and their associated openings provide lines of sight from different user locations. In this way, multiple dipsticks are provided, and they are designed to be visible from different viewing directions, so that for a range of possible user positions (e.g. as a result of different user heights), at least one dipstick is clearly visible.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A drip tray cover for a beverage machine, comprising:
a set of openings for allowing liquid to pass to a drip tray base beneath the drip tray cover; and
a projection having an open shape for facing a downward direction in use having a tip which is adapted to reach below a maximum liquid level of the drip tray base beneath and thereby function as a dipstick,
wherein at least one opening of the set of openings is positioned to enable a line of sight to the projection from a user location of the beverage machine, and
wherein the projection comprises a folded down cut-out portion of the drip tray cover.

2. The drip tray cover of claim 1, wherein the projection is an integral part of the drip tray cover.

3. The drip tray cover of claim 1, wherein the projection extends downwardly from a location at a rear side of the at least one opening.

4. The drip tray cover of claim 1, wherein the projection comprises a marking which indicates the maximum liquid level.

5. The drip tray cover of claim 4, wherein the marking comprises an orifice or a projection.

6. The drip tray cover of claim 1, wherein the projection has a surface area and shape corresponding to the at least one opening.

7. The drip tray cover of claim 1, comprising a set of projections, each projection associated with a respective opening, wherein at least two of the set of projections and associated openings provide lines of sight from different user locations.

8. A drip tray, comprising:
a drip tray base for collecting liquid; and
the drip tray cover of claim 1.

9. A drinks machine, comprising:
a drink dispenser having a dispensing outlet; and
the drip tray of claim 8 positioned below the dispensing outlet.

10. The drinks machine of claim 9, wherein the drinks machine is a domestic drinks machine.

11. The drinks machine of claim 10, wherein the domestic drinks machine is a coffee machine.

* * * * *